United States Patent [19]
Wakefield et al.

[11] 3,933,981
[45] Jan. 20, 1976

[54] TIN-LEAD PURIFICATION OF SILICON

[75] Inventors: Gene Felix Wakefield, Richardson; H. S. Nagaraja Setty, Dallas, both of Tex.

[73] Assignee: Texas Instruments Incorporated, Dallas, Tex.

[22] Filed: Nov. 30, 1973

[21] Appl. No.: 420,484

[52] U.S. Cl. ............ 423/348; 23/273 SP; 23/301 R; 23/301 SP
[51] Int. Cl.² ........................................ C01B 33/02
[58] Field of Search ...... 423/348; 23/301 R, 301 SP

[56] References Cited
UNITED STATES PATENTS

| | | | |
|---|---|---|---|
| 2,402,582 | 6/1946 | Scaff | 23/301 SP X |
| 3,031,403 | 4/1962 | Bennett, Jr. | 23/301 SP X |
| 3,069,240 | 12/1962 | Armand | 423/348 |
| 3,097,068 | 7/1963 | Litz et al. | 423/348 |

OTHER PUBLICATIONS

Book "Preparation of Single Crystals," by W. D. Lawson and S. Nielsen, 1958 Ed., p. 93, Buttersworths Scientific Publications, London.

*Primary Examiner*—Edward Stern
*Attorney, Agent, or Firm*—Harold Levine; James T. Comfort; Gary C. Honeycutt

[57] ABSTRACT

Disclosed is a method of purifying silicon by introducing the silicon into liquid tin-lead alloy at a certain temperature. The silicon goes into solution with the tin-lead alloy, after which the temperature of the liquid metal solution is reduced to a temperature low enough to cause the solution to become supersaturated with respect to silicon which then solidifies as pure material. The solid pure silicon is withdrawn from the tin-lead solution leaving substantially all of the impurities behind.

2 Claims, 2 Drawing Figures

TIN-LEAD PURIFICATION OF SILICON

BACKGROUND OF THE INVENTION

1. Field of the Invention

This invention relates to the purification of silicon in general, and specifically to the purification of silicon in a liquid tin-lead solution.

2. Description of the Prior Art

Processes successfully used in the past include the reduction of silicon tetrachloride with zinc, cadmium, or hydrogen, the reduction of trichlorosilane (SiHCl$_3$) with hydrogen, the pyrolytic decomposition of silane (SiH$_4$); and the reduction of silicon tetraiodide and silicon tetrabromide with hydrogen. In each case, the starting materials must be carefully purified and great care exercised in the selection of storage and reaction chamber materials.

The usual sequence is to make a low-grade silicon or ferrosilicon, chlorinate the impure silicon, carefully purify the resulting halogen, and then reduce it. Huge quantities of silicon tetrachloride and trichlorosilane are produced for use in silicon manufacture so a ready source of feed stock for the semiconductor industry has been available.

Halides are most often purified by direct distillation, but occasionally other methods are used with, or in addition to the distillation. If impurities in the range of 50 to 100 ohm-centimeter are desired, pyrex or steel columns are adequate, and indeed high-silicon tetrachloride and trichlorosilane are normally shipped in steel tanks.

The first commercial process for the production of semiconductor-grade silicon used zinc to reduce silicon tetrachloride. A number of problems are associated with this method. Zinc with its high melting point poses problems. The silicon grows out in dendrites, or needles, from the walls of the container and some form of densification must be used prior to charging into a crystal puller. Even though the starting materials are carefully purified before feeding into the reactor, trace impurities still remain and appear in the deposited silicon. The zinc process has been completely supplanted by various hydrogen-reduction methods.

Silane decomposition involves the pyrolytic decomposition of silane. It has not been widely used, however, because of the difficulty of making silane and because of the hazard of its instability. Silane will ignite and explode in air and is decomposed by water containing traces of alkali.

The iodide process using the decomposition of silicon tetraiodide to form silicon is used quite often, however, because of the high cost of iodine, a recovery process is necessary. In order to obtain reasonable deposition rates, low pressures are required, so that a combination of vacuum pumps and iodine traps is required. It is because of these additional requirements that the process has thus far not proved commercially feasible.

The most used method in the manufacturing of silicon is the use of silicon tetrachloride (SiCl$_4$) and trichlorosilane (SiHCl$_3$). The use of trichlorosilane is favored over silicon tetrachloride because of faster deposition rates and because it is apparently easier to remove phosphorus and boron compounds from it. However, as in some of the previously mentioned manufacturing processes, complicated reactor systems must be used. Most reactors use a heated quartz tube. The quartz tube is very simple, may be resistance heated and produces predominantly dense silicon with some protuberances on the inside. However, the silicon bonds to the quartz, which must be removed by leaching in hydrofluoric acid. The loss of a quartz tube each run raises the processing costs and the etching usually induces contamination, as does the quartz tube itself.

Accordingly, an object of this invention is to provide a method of purifying silicon that requires only simple materials.

Another object of this invention is to provide a method of purifying silicon at low cost.

Another object of this invention is to provide a method of purifying silicon that requires only simple apparatus.

SUMMARY OF THE INVENTION

Briefly, the invention involves the introduction of metallurgical grade silicon into liquid tin-alloy solution having between 80% tin-20% lead and 50% tin-50% lead. The temperature of a portion of the melted tin-lead is high enough to cause the silicon to go into solution with the tin-lead. The solution is circulated to another cooler portion of the liquid metal container where the temperature of the solution is reduced to the point where the solution becomes supersaturated and silicon begins to crystallize. The silicon is slowly withdrawn, preferably as a single crystal, from the melt, leaving the impurities that were in the introduced silicon behind. Most of the impurities will precipitate out of the liquid metal as silicides and will drop to the bottom of the melt. Because of this precipitation as silicides, the melt remains relatively clean and thus a semicontinuous process can be attained for a long period of time before the replacement of the melt with new tin-lead is necessitated.

BRIEF DESCRIPTION OF THE DRAWINGS

The novel features believed characteristic of this invention are set forth in the appended claims. The invention itself, however, as well as other objects and advantages thereof, may be best understood by reference to the following detailed description of illustrative embodiments, when read in conjunction with the accompanying drawings.

DESCRIPTION OF THE PREFERRED EMBODIMENT

Figure 1:
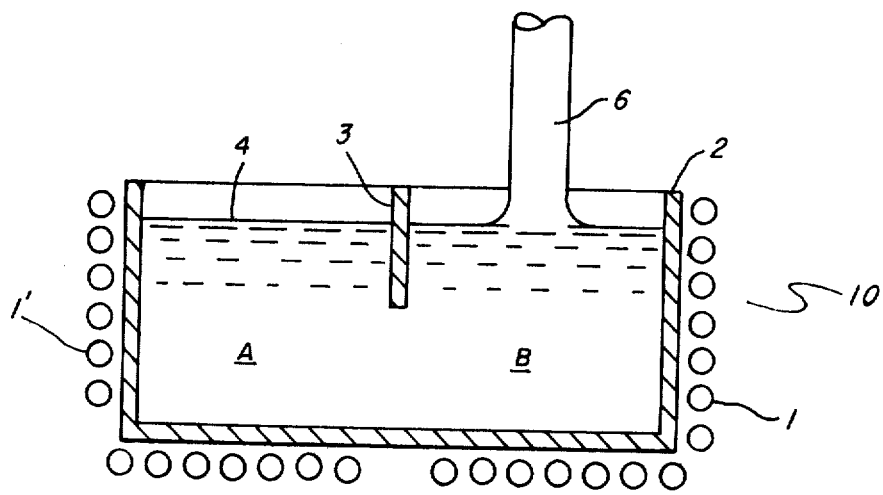
FIG. 1 is a cross-sectional view of a compartmented variable temperature refiner containing molten tin-lead alloy.

Referring now to the Figures of the drawing, in FIG. 1 there is shown a compartmented variable temperature refiner, indicated generally by the numeral 10. Although no specific source of heat is required to heat the refiner 10, the heat source must be such that the compartment A can be maintained at a higher temperature than compartment B. For the sake of illustration, the heat source is shown as two series of electrical coils heating a container, such as vat 2, so that the electrical coils 1 heating the compartment B can hold compartment B at a lower temperature than compartment A heated by the coils 1'. A divider 3 is placed inside the vat 2 to form the two compartments A and B.

The compartments A and B are charged with tin-lead alloy 4. The tin-lead alloy used has a composition range between 80% tin-20% lead and 50% tin-50% lead. The 80% tin-20% lead is the highest practical limit of tin for the solubility of the silicon in tin-lead alloys decreases as the tin content increases. Above 80% tin, the process efficiency is so low that it becomes impractical to refine silicon in this manner due to the time factor. The 50% tin-50% lead solution is the highest practical limit of lead for in compositions having higher lead content than tin, the lead tends to volatilize away. Because of the last two mentioned factors, a tin-lead solution of 80%-20% is the optimum composition.

Electrical current is allowed to flow through the heating coils 1 and 1' to heat the tin-lead alloy 4 until the tin-lead melts from a solid to a liquid. The temperature of the melt in compartment A is in the range of 900° C. to 1,100° C. with the optimum being approximately 1,000° c. The melt temperature in compartment B is held from 100° C. to 200° C. less than the temperature of the melt in compartment A, in this example optimizing at 800° C. It is to be understood that the vat temperatures at any given point will vary between the given temperatures due to the purposely created variance in compartment temperatures. After the vat 2 has stabilized at the desired temperatures, metallurgical grade silicon, preferably in the form of small chunks or powder, is introduced into compartment A and goes into solution with the tin-lead melt 4. The ratio of the added silicon to the tin-lead melt 4 ranges from 0 to slightly less than 50% by weight. Since only between 10% and 15% of the silicon will go into solution with the tin-lead alloy, higher ratios of silicon alloy are of no advantage.

The melt is circulated from compartment A into compartment B, by a pump (not shown), for example. After the melt containing silicon enters compartment B, the silicon becomes supersaturated due to the lower temperature of the melt in compartment B and will begin to solidify. A seed crystal of single crystal silicon is placed in contact with the surface of melt 4 in compartment B and is connected to a motor driven puller (not shown) which slowly pulls the seed crystal out of the melt. As the seed crystal is slowly withdrawn from the melt, purified silicon crystallizes on the silicon seed and a billet of solid silicon 6 slowly forms.

The melt 4 is constantly being circulated back from compartment B into compartment A by the pump (not shown) to allow for a semicontinuous process.

The billet 6 is of very pure silicon, having a resistivity of 50 ohm-centimeters, for example, and can be used for many semiconductor applications without further refining. If purer silicon is required, conventional zone refiners are used following the tin-lead purification. The metallurgical grade silicon that is introduced into compartment A has many impurities and many of these impurities will react with some of the silicon in compartment A and will precipitate as silicides which will drop to the bottom of the compartment A. Because of the silicide precipitation, the melt 4 will stay relatively clean and pure and will not have to be replaced for a long period of time. The rate that the silicon is added to the melt 4 in compartment A and the rate of withdrawal of the pure silicon billet 6 from the melt in compartment B are coordinated so that the amounts of silicon introduced and withdrawn are the same, thus allowing a semicontinuous silicon purification system.

When the melt 4 does become too contaminated, the contaminated melt 4 is poured out of the vat 2 and is replaced with clean tin-lead alloy. Tin-lead is the only alloy that once silicon goes into solution with the alloy, the alloy "will give up" the silicon as a solid when the temperature is reduced. Although the removed billet 6 will have small amounts of tin and lead as impurities, the silicon is pure enough for semiconductor use because tin and lead are electrically inactive and will not effect the resistivity of silicon.

DESCRIPTION OF ALTERNATE EMBODIMENT

Figure 2:
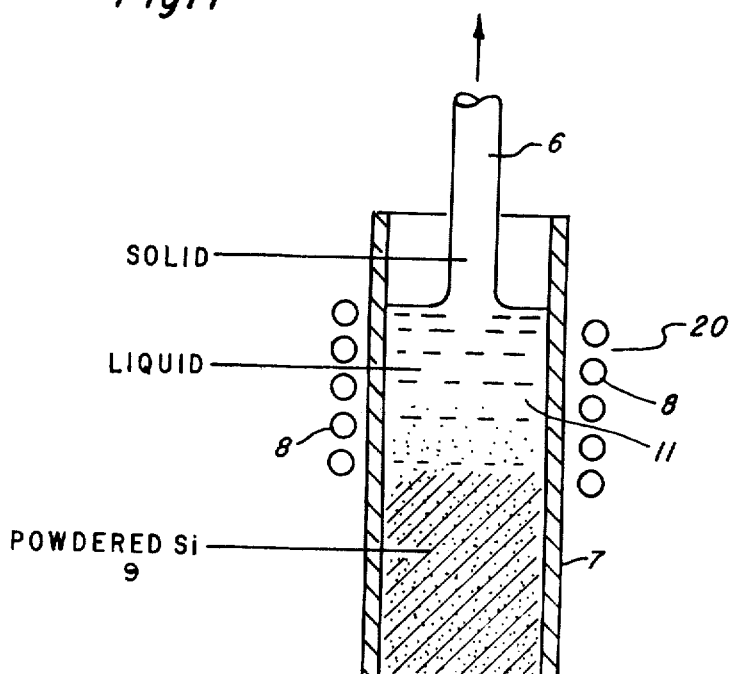
FIG. 2 is a cross-sectional view of a zone refiner containing molten tin-lead alloy.

Although the just described method is the preferred embodiment of this invention due to the large amount of silicon that can be purified at one time, an alternate embodiment is described in conjunction with FIG. 2. A zone refiner is indicated generally by the numeral 20 and has a container or quartz tube 7, for example, which has a section of electrical heating coils 8 which can be moved in relationship to the quartz tube 7 so that different portions of the quartz tube 7 can be heated sequentially.

The quartz tube 7 is partially filled with powdered silicon 9 and a quantity of powdered tin-lead alloy 11 having the same tin-lead ratio range as was described in conjunction with FIG. 1 is placed on top of the silicon powder 9. The amount of the silicon 9 placed in the tube 7 is approximately five times the amount of the tin-lead alloy 4. The coils 8 are used to heat the tube 7 to a temperature of approximately 1300° C., although the temperature range of the melt is as previously described. To begin the operation, the coils 8 are located at the bottom of the tube 7. The coils slowly traverse upward by an electric motor system (not shown) at a speed slow enough to remove the volatile impurities in the silicon powder and to sinter the powdered silicon but not to melt the silicon, (the tube 7 being held in a vacuum during the sintering step only or the lead will volatilize). The sintering step can be eliminated, if desired. As the heated coils pass the tin-lead alloy, the alloy melts and will begin to take the silicon into solution. A silicon seed crystal 5 is connected to a motor driven puller (not shown) that will pull the silicon seed 5 from the melt at a constant rate of speed.

The coils 8 then begin to traverse downward and as the coils 8 do so, the silicon at the alloy-silicon interface is introduced into and goes into solution with the tin-lead alloy. As the coils traverse further downward, the portion of the liquid solution above the coils will begin to cool. The silicon will be in supersaturation due to the lower temperature and will begin to crystallize and begin to form billet 6 on the seed. The upward speed of the pulled billet 6 is coordinated with the downward speed of the traversing coils 8 so that a constant diameter billet 6 is obtained.

Most of the impurities precipitate out as insoluble silicides and will concentrate in the bottom of the tube 7. As soon as the traversing coils 8 reach the bottom of the tube 7, the process is completed, and the tube 7 has to be recharged for subsequent refining.

Specific temperatures have been given in most cases, but the temperatures are not extremely critical and can be varied within the ranges given.

Although a preferred embodiment and an alternate embodiment of the invention have been described in detail, it is to be understood that various changes, substitutions and alterations can be made therein without departing from the spirit and scope of the invention as defined by the appended claims.

What is claimed is:

1. The method of purifying silicon in a refiner containing liquid tin-lead alloy at varying temperatures, comprising the steps of:

a. introducing impure solid silicon into a molten tin-lead alloy, said alloy having a composition ranging between 80% tin - 20% lead and 50% tin-50% lead, and said impure silicon being introduced into a first compartment of said refiner, the temperature of said first compartment being sufficiently high to cause the silicon to go into solution with said alloy;

b. circulating said solution of liquid alloy and silicon from said high temperature zone into a second compartment of said refiner maintained at a low temperature zone, the temperature range of said low temperature zone being sufficiently lower than the high temperature zone of said first compartment to cause said silicon to become supersaturated and to begin to crystallize; and c. removing purified solid silicon from said low-temperature zone as said silicon crystallizes, leaving impurities of said silicon behind in said liquid alloy.

2. The method of purifying silicon in a tin-lead alloy of varying temperature, as defined in claim 1, including the step of continuously introducing said impure solid silicon to be purified into said alloy, and continuously removing said purified solid silicon from said alloy.

* * * * *